2,848,308

COMPOSITION OF MATTER

Alfred H. Free, Elkhart, Ind., assignor to Miles Laboratories, Inc., Elkhart, Ind., a corporation of Indiana No Drawing. Application December 5, 1955
Serial No. 550,859

6 Claims. (Cl. 23—253)

This invention relates to a novel method and means for the detection and estimation of glucose.

The invention has for one of its primary objects the provision of a simple, rapid and convenient means for performing such test with a high degree of simplicity and without the need for extensive equipment, trained personnel and the like.

While the present invention is applicable to the determination of the glucose content of a wide variety of materials, one of its most important applications is in the detection of glucose in body fluids such as urine. The determination of glucose in urine is, of course, of signal importance not only to diabetic patients who must control their sugar input, but is essentially involved in those situations where large numbers of people are screened to determine the incidence of diabetes among them. A simple, rapid, convenient, and reliable test for detecting glucose in urine particularly in situations such as the foregoing would be of tremendous importance as an aid in the detection of this disease.

There are a number of methods, of course, which can be used to measure or estimate the amount of glucose in urine. The more widely used of the conventional are based on the use of alkaline copper solutions which are heated with the materials being tested to precipitate cuprous oxide.

The old methods have had the disadvantage that their use has required a certain amount of skill and familiarity with the use of measuring equipment such as pipettes and the like, the use of liquid reagents some of which, especially the alkaline ones, were dangerous to handle and inconvenient to transport easily.

More recently a diagnostic tablet described in U. S. Patent No. 2,387,244, Compton and Treneer, has found wide usage because of its relative simplicity, accuracy, economy and the fact that the test, unlike older tests could be executed by unskilled persons.

However, all of these tests, techniques, and procedures have as characteristics in common the need for heat generally supplied by some extraneous source like a Bunsen burner to carry out the tests, and also require a test tube or like container within which the testing is to take place. Some of these tests additionally are impractically time-consuming.

The aforesaid Compton and Treneer invention eliminated the need for an extraneous source of heat by providing a "built-in" heat source in a tablet combined with a glucose-reagent mixture and provided a test which was far superior to the older ones. However, even with that improved test heat was necessary which meant that a certain degree of care had to be exercised in the compounding and the subsequent handling of the composition to eliminate the possibility of unintentional generation of the heat as by accidental wetting of the composition.

I have now found a novel and highly effective means for detecting glucose in various materials including body fluids, particularly urine, which is simple, economical, rapid, convenient, reliable, which does not require the use of external or in fact any heat source, lends itself particularly well to use when "mass screening" of people for diabetes detection is employed, and which is free of many of the disadvantages which characterize prior compositions, testing means and procedures.

In practicing my invention, I prepare a composition of two enzymes which are described below, an indicator whose color is affected by hydrogen peroxide in the presence of one of these enzymes, and in addition to the foregoing and desirably, a buffer to keep the pH of the reactants at the site of reaction within a predetermined range, a stabilizer such as gelatin or similar material, and in certain situations a dye to make color reading easier. The enzymes are, respectively, glucose aero-dehydrogenase, sometimes known as glucose oxidase, which is capable of converting glucose to gluconic acid in the presence of atmospheric oxygen and at the same time of forming hydrogen peroxide and, secondly, an enzyme which is commonly called peroxidase although the term catalase may (while commonly used for a different type of action on hydrogen peroxide) in some instances be applied to this enzyme which is capable of oxidizing certain substances such as oxidizable dyes when it is present together with such dye and hydrogen peroxide.

Such a composition may be made into a suspension or solution and used to impregnate a bibulous material such as paper, wood, fiber or the like, having any desired size or shape; such a product after drying (though drying is not essential) will undergo a distinct color change when contacted with glucose-containing material, e. g. urine.

Alternatively my composition may be by suitable, hereinafter described means, applied to "splinters," "sticks" or "strips" made of e. g. wood, fiber, paper, glass, metal or plastic, using gelatin or similar material for effecting adhesion. Such "sticks" will turn color when moistened with a glucose-containing fluid.

Alternatively, also, such a composition may be formed into a tablet and used by applying the fluid to be tested to the tablet, e. g. placing a drop or two of suspect urine on the face of the tablet.

The following examples will serve to document a number of specific embodiments of my invention, and illustrate its flexibility. I have chosen these embodiments hereinafter described as illustrative of my invention and it will be apparent that various modifications may be made without departing from the spirit and scope of my invention.

Example I

A mixture was prepared containing:

| | | |
|---|---|---|
| Orthotolidine dihydrochloride | mg | 100 |
| Glucose oxidase | mg | 200 |
| Peroxidase | mg | 5 |
| Gelatin | mg | 200 |
| A buffer composed of a mixture of anhydrous citric acid and trisodium citrate $\cdot 2H_2O$, ground together in a mortar in a ratio of 31:66 by weight | gm | 2 |
| F D and C soluble Red No. 3 | mg | 5 |

In preparing this mixture, the gelatin was dissolved in 5 ml. of boiling water and cooled to room temperature. The 2 gm. of solid buffer was suspended in 5 ml. of water and mixed with the gelatin to give a clear solution. The orthotolidine dihydrochloride was dissolved in 5 ml. of water and added to the above mixture, and immediately then there was added 2.5 ml. of water containing the peroxidase and glucose oxidase and 2.5 ml. of water containing the dye. This was mixed and filter paper strips were dipped in it. Each strip measured 2 inches by ¼ inch and the strips were air dried or vacuum dried after the dipping. When immersed in a solution containing glucose (such as urine) the strips turned blue in less than one minute.

Variations in the foregoing ingredients are, of course, possible within the skill of the art. For example, the orthotolidine dihydrochloride content may vary from 20 to 200 parts; the peroxidase content is also variably present in from 1 up to 100 parts. (This is an expensive ingredient and ordinarily it is unnecessary to use more than about 5 parts of this material in this particular formulation.) The glucose oxidase may vary from 25 to 500 parts. The gelatin content may be up to 1000 parts, the upper limit being dictated by the absorption properties imparted to the composition; too much gelatin naturally retards absorption of urine into the test composition and slows up and interferes with the test; ordinarily it is preferred that from 50 to 500 parts of gelatin be present. Sufficient buffer should be used to 'dominate" the pH of urine, so that the pH of the composition where the reactions occur ranges from about pH 4 to about pH 6, preferably, about pH 5. About 5 parts of dye are ordinarily sufficient, although since the dye in any event functions to mask discolorations in the bibulous strip, or stick brought about by air, heat or light, variable amounts may be required; a quantity sufficient to give a light color should be used. Besides F D & C Red #3, I can use other dyes like D & C Yellow #3. In fact almost any contrasting color can be used, to contrast with the color assumed by the indicator of choice. For instance if the indicator is o-tolidine, which causes a deep blue color to be formed when the test composition strip, stick or tablet is contacted with a positive urine, then the dye should be any color but blue, purple or green.

It will be understood that a number of buffer systems are available, and well known in the art, which will "dominate" the urine and effect a pH at the site of the reaction between about pH 4 and pH 6, preferably, about pH 5.

*Example II*

The following mixture was prepared:

200 mg. glucose oxidase
    5 mg. peroxidase
    200 mg. orthotolidine dihydrochloride
    100 mg. gelatin
    15 ml. water This suspension was used to impregnate strips of bibulous filter paper (Eaton and Dikeman #623–026). One hundred strips were made from this suspension, each strip measuring approximately 2 inches by ¼ inch. After drying—air or vacuum—and immersion in glucose-containing urine, the strips turned blue in less than a minute.

*Example III*

A mixture having the following composition was prepared:

200 mg. glucose oxidase
    5 mg. peroxidase
    200 mg. orthotolidine dihydrochloride
    816 mg. potassium acid phthlate
    100 mg. gelatin
    20 ml. water Strips of bibulous paper were prepared by the procedure described in the foregoing examples, and turned blue when contacted with glucose-containing solutions.

*Example IV*

A mixture having the following compositions was prepared:

200 mg. glucose oxidase
    5 mg. peroxidase
    200 mg. orthotolidine dihydrochloride
    5 ml. 2 N pH 5.5 phthalate buffer
    100 mg. gelatin
    15 ml. water This mixture was used to prepare test strips by the foregoing procedure; the strips after drying gave a sharp blue color when immersed in glucose positive urine.

*Example V*

A solution containing the following was prepared:

50 mg. glucose oxidase
    5 mg. peroxidase
    450 mg. orthotolidine dihydrochloride
    100 mg. sodium acetate
    20 ml. water The foregoing mixture was used to prepare test strips by the foregoing procedure, which gave similar results when immersed in glucose-containing urine.

*Example VI*

A mixture having the following composition was prepared.

200 mg. glucose oxidase
    5 mg. peroxidase
    200 mg. orthotolidine dihydrochloride
    20 ml. water This mixture was used to impregnate filter paper strips which previously had been impregnated with benzoic acid. In this treatment 20 ml. of ether was mixed with 5 gm. of benzoic acid. The ether was evaporated from the strips and the excess of benzoic acid on the other surface of the strip was brushed off; the finished strips were then ready for use in testing for urine as disclosed in Example I.

*Example VII*

One hundred strips of filter paper, 2 inches by ¼ inch wide were impregnated with nicotinic acid by dipping the strips in a solution made by dissolving one gram of nicotinic acid in 20 ml. of hot water. The strips were then dried in an oven, an subsequently impregnated with a mixture having the following composition:

200 mg. glucose oxidase
    5 mg. peroxidase
    200 mg. orthotolidine dihydrochloride
    20 ml. water After drying, the strips were used for testing for glucose in the same manner as described in Example I.

*Example VIII*

A composition in powder form was prepared having the following components:

200 mg. glucose oxidase
    5 mg. peroxidase
    200 mg. orthotolidine dihydrochloride
    1600 mg. boric acid A drop of glucose-containing solution (e. g. urine) was placed on a square of filter paper and a small amount of the above powder mixture placed on the moist area. The filter paper turned to blue when one or two drops of water were added to the powder.

*Example IX*

Another powder composition was prepared having the following components:

200 mg. glucose oxidase
5 mg. peroxidase
200 mg. orthotolidine dihydrochloride
1600 mg. citric acid-sodium carbonate (ratio of 64 parts citric acid to 18 parts sodium carbonate by weight)

This effervescent mixture was used for testing as in Example VIII.

*Example X*

The powder compositions described in Example VIII and IX above were made into tablets and the tablets then used to detect glucose, in either of two ways as follows:

A. A filter paper square was moistened with a drop of glucose-containing solution, a tablet then placed on the moistened area and two drops of water allowed to flow over it. A blue color developed on the paper.

B. The tablet was moistened with a drop of solution tested and turned blue when glucose was present.

*Example XI*

A small piece of wooden applicator stick was coated with a 33% gelatin solution which acted as an adhesive and also as a specific compound enhancing the reaction. The stick was then rolled or immersed in either of the powder compositions described in Example IX or X; the "stick" turned blue when dipped into a solution containing glucose.

*Example XII*

A small envelope measuring ½ inch wide and 2 inches long was filled with the powder composition described in Examples VIII or IX. The envelope was then sealed and could be used for testing for glucose by merely dipping it in the solution. In the presence of glucose, the envelope developed a blue color.

*Example XIII*

Powders or tablets such as described in Examples VIII, IX or X may be used to test for glucose on a paper previously dipped in a glucose-containing solution and allowed to dry. This procedure has the advantage in that it facilitates obtaining a sample at one place and testing it at a later time and at another place.

A striking characteristic of bibulous strips impregnated with those of the foregoing compositions that contained gelatin as a component was the absence of what I call "banding." In those examples where the bibulous paper strip was impregnated with a composition that did not contain gelatin as a component, the blue color that occurred when the strip was contacted with glucose-containing urine was not as sharp, deep, or as clearly defined as with the strips made with the gelatin-containing compositions, and the color in the former case was in the form of a "band" which was rather poorly defined and had migratory fringe areas of more or less inconclusive color quality, shade and depth. When, on the other hand, gelatin was present in the formulation, the resulting bibulous strip on being contacted with glucose-containing urine developed a surprisingly deep, sharply defined and unmistakable color wherever the glucose-containing urine contacted the treated portion of the strip. This, of course, is eminently desirable in that it makes a positive reading easier to make and eliminates what might otherwise be doubtful determinations.

While gelatin is the preferred agent for preventing the aforesaid banding phenomenon, other materials having utility in this regard are, for example, glutamic acid, glycine, and other protein degradation products like polypeptides, proteoses and the like.

The preferred indicator component of my composition is o-tolidine, conveniently as the dihydrochloride; other indicators which can be used are those represented by meta-toluidine, mixtures of benzidine and guaiacol, and 2,7-diaminofluorene.

In the foregoing examples the particular glucose oxidase used had an activity of about 2600 units per gram, a unit being by definition that quantity of enzyme which will cause a rate of oxygen uptake of 10 cubic mm. of oxygen at 30° C. by a solution of glucose contained in a Warburg flask. The peroxidase used was obtained from horseradish and its activity was of about the same order as that of the hemoglobin of blood.

There is a wide variability possible in the ratio of glucose oxidase and peroxidase which can be used in preparing the compositions used in the practice of my invention: For example the glucose oxidase content can be increased as much as one hundred times and decreased to even $\frac{1}{10}$ of the amount described and still provide a functional testing device. And it is necessary only that there be sufficient oxidase to catalyze the oxidation of the glucose and enough peroxidase so that it can exercise its own enzyme activity.

And, of course, my invention in any of its various forms e. g., as paper strip or similar bibulous material containing the enzymes, buffers, indicators and the gelatin, or as the tablet or powder can be used to determine the glucose content of not only body fluids (including blood serum, whole blood, urine and the like) but any glucose-containing fluid which does not possess inhibitors for the enzymes, glucose oxidase and peroxidase, or will not otherwise interfere with the reaction.

This application is a continuation-in-part of my co-pending applications, Serial No. 422,977, filed April 13, 1954, and Serial No. 514,395 filed June 9, 1955.

I claim:

1. A composition for detecting glucose in urine which comprises glucose oxidase, peroxidase, an indicator which is oxidized by hydrogen peroxide in the presence of peroxidase and undergoes a color reaction during such oxidation, a buffer for maintaining the pH of the aforesaid mixture at about 4 to about 6 in the presence of urine, and material selected from the group consisting of proteins and protein degradation products.

2. A test indicator for detecting glucose which comprises a bibulous material which contains therein a mixture of glucose oxidase, peroxidase, an indicator which is oxidized by hydrogen peroxide in the presence of peroxidase and undergoes a color reaction during such oxidation, a buffer for maintaining the pH of said mixture at about 4 to about 6 in the presence of urine, and material selected from the group consisting of proteins and protein degradation products.

3. A test indicator for detecting glucose which comprises a bibulous material which has been contacted with a composition comprising from 20 to 200 parts of o-tolidine, from 1 to 100 parts of peroxidase, from 25 to 500 parts of glucose oxidase, sufficient buffer so that when said indicator is contacted with urine it dominates the pH of the urine and effects a pH at the reaction site of from about pH 4 to about pH 6 and from 50 to 500 parts of gelatin.

4. The article of claim 3 wherein the bibulous material is paper.

5. A test indicator for detecting glucose which comprises a bibulous material containing impregnated therein a composition comprising 100 parts of o-tolidine; 5 parts of peroxidase, 200 parts of glucose oxidase, 200 parts of gelatin, 2000 parts of a mixture of citric acid and sodium citrate for effecting a pH at the reaction site of about pH 4 to about pH 6 when the indicator is contacted with urine, and a dye for facilitating the reading of color changes when said indicator is contacted with urine.

6. The article of claim 5 wherein the bibulous material is paper.

References Cited in the file of this patent

UNITED STATES PATENTS

| | | |
|---|---|---|
| 2,482,724 | Baker | Sept. 20, 1949 |
| 2,671,028 | Clark | Mar. 2, 1954 |

FOREIGN PATENTS

| | | |
|---|---|---|
| 708,996 | Great Britain | 1952 |

OTHER REFERENCES

Keilen et al.: Biochemical Journal, vol. 42, pp. 230–238.